June 21, 1966   B. J. HELDERS   3,257,100
GARDENING TOOL FOR PULLING WEEDS
Filed March 16, 1964
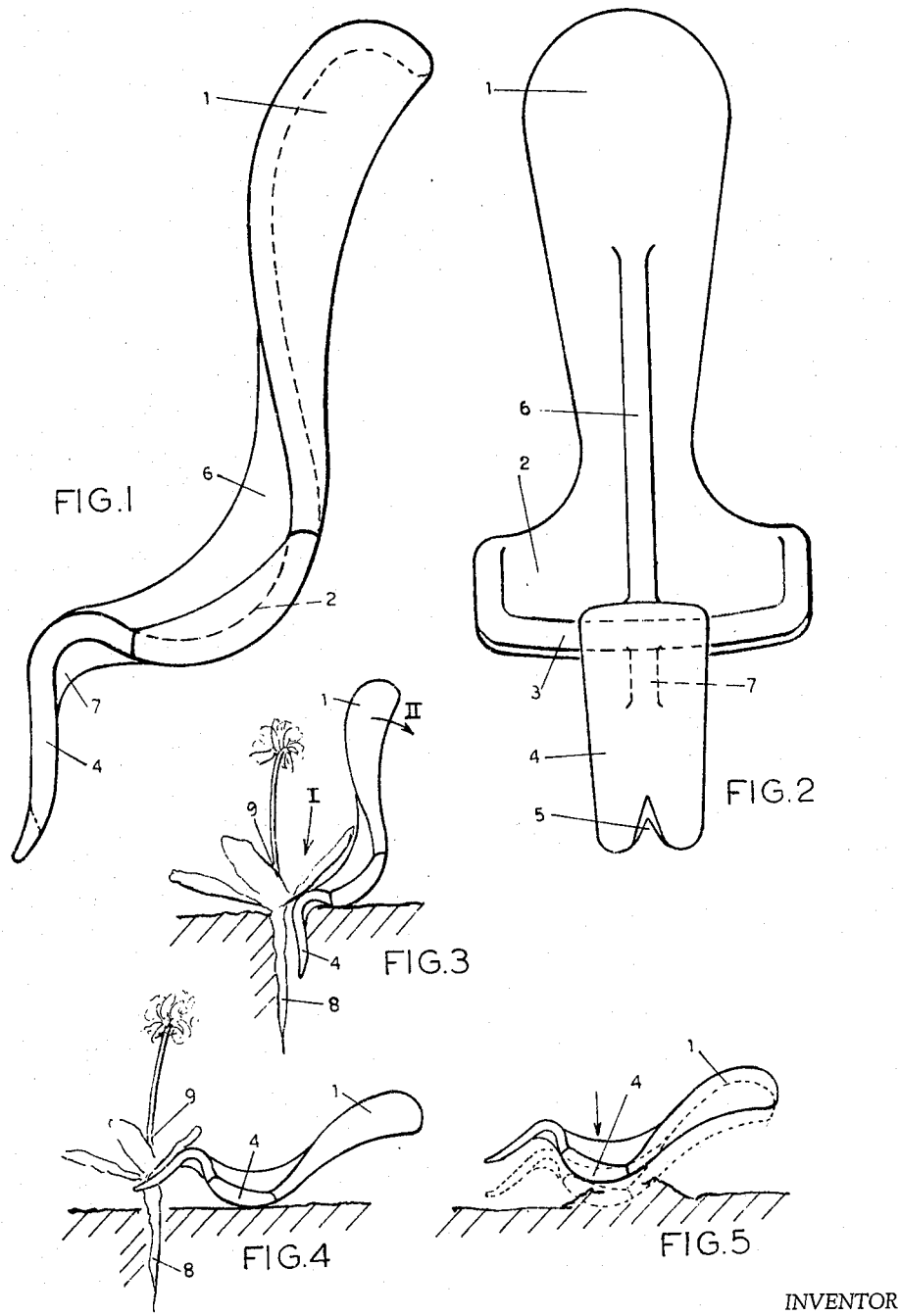
INVENTOR
BARTHOLOMEUS J. HELDERS
BY *Emisie & Smiley*
ATTORNEYS

United States Patent Office 3,257,100
Patented June 21, 1966

3,257,100
GARDENING TOOL FOR PULLING WEEDS
Bartholomeus J. Helders, Gortelseweg 45,
Vaassen, Netherlands
Filed Mar. 16, 1964, Ser. No. 351,934
1 Claim. (Cl. 254—132)

My invention relates to the art of gardening tools and more particularly to a gardening tool for pulling weeds.

It has already been proposed in U.S. Specification 2,121,265 to provide such a tool with a handle ending at the under end in a semi-circular bend with enlarged breadth with respect to the breadth of the handle, said bend carrying at the under end a narrow elongated lip under an angle with respect to the under end of the bend, the free end of the lip being provided with a substantially V-shaped opening. This gardening tool is constructed of a certain number of separate parts, in consequence of which the manufacture is costly. Moreover, in order to obtain a sufficient strength for pulling weeds this tool has to be constructed from steel bar of sufficient gauge. This increases the costs and the weight of the tool.

The principal object of my present invention is to provide an easily manufactured sturdy tool for extracting weeds from lawns and the like, said tool having a low weight and reduced manufacturing costs and being easily manipulated with a minimum of force and effecting an extraction of weeds with a minimum excavation of earth.

The tool according to my invention is characterized in that the complete tool consists of a single casting, especially made by die casting or injection moulding f.i. under high pressure, said casting being provided at the front side of the handle with a reinforcing rib, the rear side of the lip of the casting being provided with a second reinforcing rib at the junction with the bend.

Further particulars of my invention will be apparent from the following description taken in connection with the accompanying drawing, wherein FIG. 1 is a side elevation of a gardening tool made after the teachings of my invention.

FIG. 2 is a top plan view of the tool shown in FIG. 1.

FIGURES 3, 4 and 5 show my tool as used in pulling weeds or in thinning out plants.

In the drawing 1 designates a handle at the under end ending in a semi-circular bend 2 with enlarged breadth with respect to the breadth of the handle 1. Said bend 2 carries at the under end a narrow elongated lip 4 under an angle of about 90° with respect to the under end of the bend 2. The free end of the lip 4 is provided with a substantially V-shaped opening 5, so that it will be relatively easy to center the tool on a weed of plant root and by pressing the tool with the handle 1 downwardly (see arrow II in FIG. 3) said root will be forced into the apex of the opening 5 for a secure engagement for the tool on the root. By pressing down the handle 1 further the root 8 of the weed 9 is raised out of the ground with a minimum of effort, see FIG. 4. When the weed is loosened, if it has a deep root, the entire tool is raised upwardly of the ground completely removing the root from the ground, where it may be stripped from the tines of the lip 4 by hand, leaving the tool ready for further use. After pulling the weed from the ground the surface of the ground may be flattened by means of the bend 2 as indicated in FIG. 5.

The strength of my tool is due in particular to a reinforcing rib 6 at the front side of the handle 1 and the bend 2. A second reinforcing rib 7 is provided on the rear side of the upper part of the lip 7 at the junction with the bend 2.

The form of my tool with the reinforcing ribs 6 and 7 provides a considerable strength in use, so that it becomes possible to use less material than in a similar tool of known construction. However, my improved construction is rather difficult to obtain by ordinary metal working methods as milling, forging or the like. According to my invention the improved form may be obtained easily by making the complete tool of a single casting, especially made by die casting or injection moulding e.g. high pressure injection moulding. My die casted tool should consist of a strong and corrosion free material. For this material a light metal, especially aluminum or an aluminum alloy, may be used. My tool made by die casting may also consist of zinc or a zinc alloy. Moreover, it is possible to use for my tool a die casting, consisting of a hard and strong plastic and made by injection moulding. A suitable plastic is available under the trade mark "Nylon."

In the alternative embodiment of my invention the lip 4 may be provided with two or more V-shaped openings of different size, angle or depth.

The foregoing description and the accompanying drawing are believed to clearly disclose preferred embodiments of my invention, but it will be understood that this disclosure is merely illustrative and that such changes in the invention may be made as are fairly within the scope and the spirit of the following claim.

What I claim is:

A gardening tool comprising a one-piece die cast rigid member which is composed of a rigid handle portion, a rigid tine portion and a rigid connecting portion connecting the handle portion and the tine portion, said connecting portion being arcuate and having a center portion and opposing upper and lower ends and a rear convex face and a front concave face, said handle portion extending from the upper end of the connecting portion, said connecting portion having an upwardly curved juncture portion formed at its lower end connecting it to the tine portion; said tine portion depending from the juncture portion and being disposed substantially normal to the center portion of the arcuate connecting portion, said handle portion being disposed substantially normal to the center portion of the arcuate connecting portion with said handle portion and tine portion lying in offset parallel planes relative to the center portion of the arcuate connecting portion, said convex face of the arcuate connecting portion defining a fulcrum heel, a first relatively narrow, reinforcing rib projecting outwardly from the concave face of the arcuate connecting portion and disposed normal thereto and extending along said concave face from the handle portion at a point substantially above the connecting portion to the upper end of the tine portion and disposed centrally of the width of the handle portion and the arcuate connecting portion, a second relatively narrow, reinforcing rib projecting from the underside of the juncture portion and disposed normal thereto and extending from the lower end of the connecting portion to the upper end of the tine portion, said fulcrum heel having an initial ground surface fulcrum point adjacent the lower end of the connecting portion and behind the point of connection between the juncture portion and the lower end of the connecting portion, said tool being rockable when the tine portion is embedded in the ground by the application of force on the handle in a direction away from the tine portion about such initial fulcrum point in the initial movement of the tool with the fulcrum heel serving as continuing successive fulcrum points until the tine portion is moved in an arcuate path out of the ground, said first and second ribs being disposed in the same plane and being of substantially equal width, and said second rib having an inwardly curved outer edge complementing the curvature of the juncture portion.

References Cited by the Examiner

UNITED STATES PATENTS

| | | | |
|---|---|---|---|
| D. 191,619 | 10/1961 | Grahovac | 254—132 X |
| 1,508,489 | 9/1924 | Vlchek | 254—25 |
| 1,724,026 | 8/1929 | Joseph | 254—132 |
| 2,121,265 | 6/1938 | Ruffcorn | 254—132 |
| 3,181,234 | 5/1965 | Gill | 254—131 X |

WILLIAM FELDMAN, *Primary Examiner.*

OTHELL M. SIMPSON, *Examiner.*